UNITED STATES PATENT OFFICE.

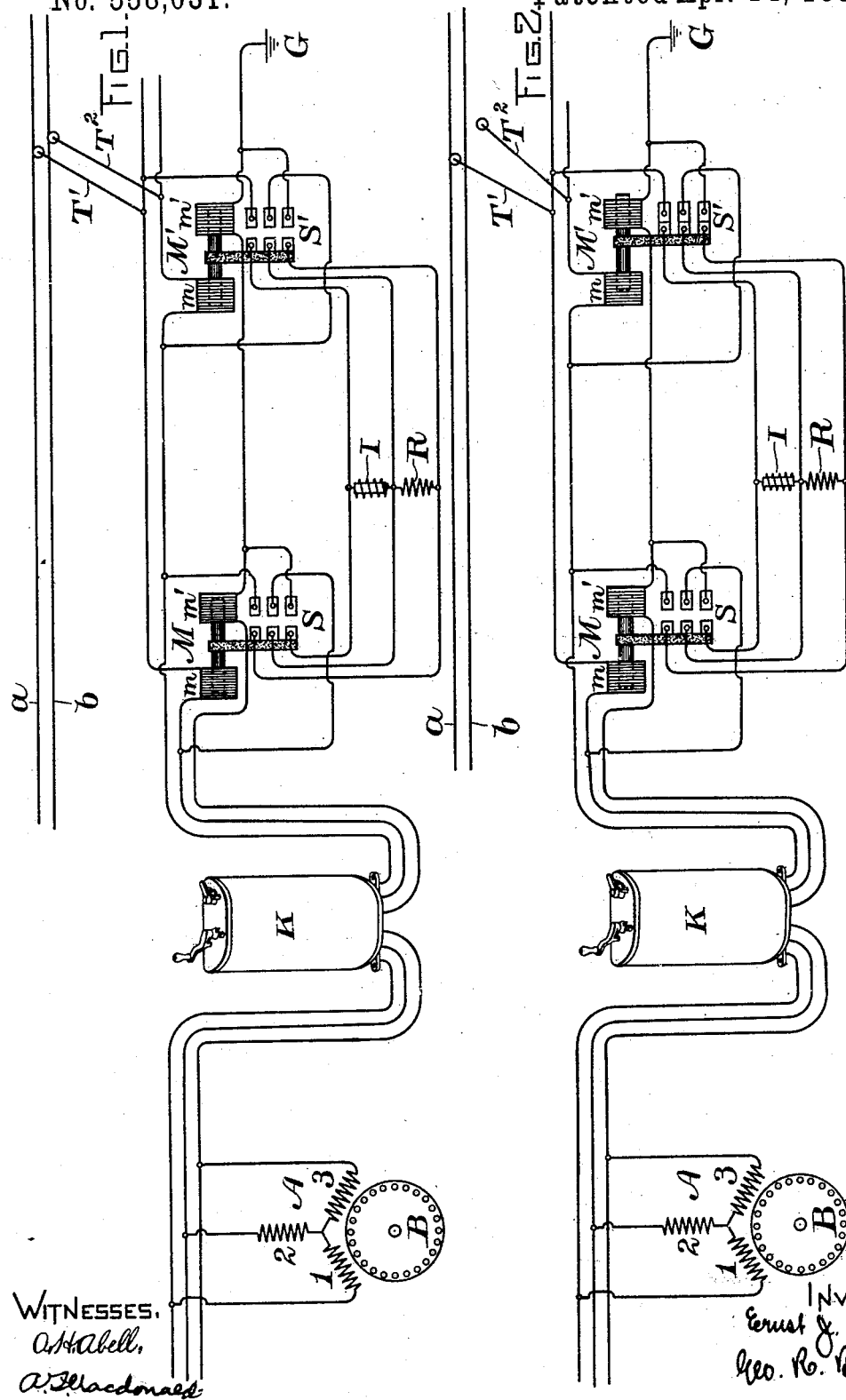

ERNST J. BERG, OF SCHENECTADY, NEW YORK, ASSIGNOR TO THE GENERAL ELECTRIC COMPANY, OF NEW YORK.

SAFETY DEVICE FOR ALTERNATING SYSTEMS.

SPECIFICATION forming part of Letters Patent No. 558,031, dated April 14, 1896.

Application filed October 5, 1895. Serial No. 564,725. (No model.)

*To all whom it may concern:*

Be it known that I, ERNST J. BERG, a subject of the King of Sweden and Norway, residing at Schenectady, in the county of Schenectady, State of New York, have invented certain new and useful Improvements in Safety Devices for Alternating-Current Power Systems, (Case No. 282,) of which the following is a specification.

My invention relates to alternating-current power systems, particularly to those operated by polyphase currents, and has for its object to provide for such systems a safety device adapted to prevent accidents when for any reason the power supply is interrupted on one of the lines.

It is well known that after a motor has attained speed in a polyphase system of distribution, if one of the lines be disconnected for any reason, the motor then acts either as a synchronous or an induction single-phase motor. Such a motor is incapable of reversal by reversal of leads. In many cases it is desirable to preserve this capacity for immediate reversal. This is particularly true on electric-railway lines where emergencies may demand that the car shall be reversed to bring it to a quick stop.

It is to provide especially for cases of this class that I have devised my present invention, which consists, briefly, in means for supplying an interposed electromotive force of displaced phase to the motor, such means being brought into operation by an interruption of the supply in either of the circuits. The motor is then continuously operated as a polyphase machine, and becomes capable of reversal by reversing two of the leads, acting much like a continuous-current motor under similar circumstances.

The accompanying drawings are diagrams illustrating embodiments of my invention, Figure 1 showing the apparatus in its normal operation, and Fig. 2 the operation in an emergency requiring the application of my invention.

The particular means which I have illustrated to carry out my invention consists of a switch so arranged as to interpose between the two remaining mains of the three-phase system (which acts as a single-phase system when the third main is disconnected or the power fails in that main) means for obtaining a displaced phase. I have illustrated the combination of an inductance and resistance in series between the mains and a connection from the third terminal of the motor to a point between the inductance and the resistance. This is not of my sole invention, but is described and claimed in its broader aspects in an application of Charles P. Steinmetz and myself, Serial No. 562,037, filed September 10, 1895. With this arrangement I combine an "emergency switch," as I prefer to call it, by which, if one of the trolleys should fly off in the system illustrated, the contacts of the switch would be closed and the inductance and resistance would be connected in, as presently to be described. The switch is operated by balanced magnets, so that when the supply fails its operation becomes automatic. It is manifest that this is the preferred method, inasmuch as it does not demand attention from the motorman. For it, however, I may substitute manually-actuated devices without departing from the spirit of my invention.

Referring now to the drawings, A is the field of the motor, and B is its armature, the machine being represented as a three-phase induction-motor of the type now well known.

$a$ $b$ are the trolley-lines.

$T'$ $T^2$ are the trolleys.

M M' are the balanced magnets referred to, in each of which one coil $m'$ is in the ground-circuit, and the other coil $m$ of each magnet, respectively, is in one of the trolley-circuits. The switch S is controlled by the magnet M in the circuit of the trolley $T'$, and the switch S' by the magnet M'.

I is an induction-coil, and R is a resistance.

As illustrated in Fig. 1, neither one of the switches is closed and the circuit is in normal operation, the motor running as a three-phase machine.

Referring now to Fig. 2, the same letters and numerals indicate like parts, but the switch S' in this figure is closed and the trolley $T^2$ is represented as off the wire $b$. In this case the coil $m$ of the magnet M' is dead and the coil $m'$ in the ground-circuit is energized, the terminal of the coil 3 of the field A of the motor being permanently connected to ground. The circuit in this case is from the trolley T' through the coil m of the magnet M to the coil 2 of the motor-field, thence dividing, going through the coil 3 of the motor-field and the coils m' m' of the magnets M M' to ground. The motor-coil 1 is connected, as will be readily seen, by means of the circuits from the switch S', between the trolley T' and the ground, as follows: passing from the trolley T' to the right, and thence to the upper contact of the switch S', through the inductance I to the center contact of the switch, thence to the line of the trolley T², and thence to the coil 1 of the motor. The other connection is from the ground-circuit, the lower contact of the switch S', through the resistance R to the center contact of the switch, and the third terminal of the motor.

It will be seen that the effect of the interpolated inductance and resistance in the line is to take to the coil 1 of the motor an electromotive force of displaced phase, thus adapting the motor to still operate as a three-phase polyphase electric motor, in accordance with the principles set out in the application of Steinmetz and Berg above referred to. It is to be understood that suitable combinations of inductance, resistance, and capacity, as pointed out in that application, may also be employed to attain the objects of this invention.

I have not illustrated any particular form of controller for the motor, because these are of various types, and the particular type selected is unimportant. It is of course necessary that the controlling device should be capable of reversing two of the leads of the motor, but it is otherwise unimportant what its construction may be. As illustrative of a suitable type of controller may be named the one shown in the patent to A. H. Armstrong, No. 539,404. Such a controller is diagrammatically indicated at K in the drawings.

I have also not further illustrated the operation of the switch S, inasmuch as its effect is the same as that of the switch S', except that it operates upon the coil 2 of the motor-field. It is manifest that, as the third coil of the field is grounded permanently, it is unnecessary to interpolate a switch in that lead; but if there were three metallic conductors another switch might be used without departing from my invention, its construction and operation being the same as that of those already described.

What I claim as new, and desire to secure by Letters Patent of the United States, is—

1. In an alternating electric power system, power-lines supplying polyphase currents, a motor actuated by such supply-lines, and means for supplying to the motor an electromotive force of phase displaced from that of either of the lines, such means operated by a failure of current from one of the supply-lines.

2. In an alternating-current power system, polyphase supply-lines, a motor connected with all of the said lines, means for supplying to the motor an electromotive force of phase displaced from that existing between any pair of the polyphase lines, and switches for bringing such means into operation.

3. In an alternating-current power system, polyphase supply-lines, a motor actuated therefrom, means for supplying to the motor an electromotive force of a phase displaced from that of either of the lines, switching mechanism for bringing such means into operation, and automatic means for controlling the switching mechanism, the automatic means being actuated by the failure of current in one of the lines.

4. In an alternating-current electric railway, polyphase supply-lines, a motor actuated thereby having some of its terminals connected to the supply-lines, and some to ground, inductance and resistance arranged in a normally-disconnected auxiliary circuit, and switching mechanism for connecting the inductance and resistance between one of the lines and the ground, and connecting a terminal of the motor between the inductance and resistance.

5. In an alternating-current electric railway, polyphase supply-lines, a motor actuated thereby having some of its terminals connected to the supply-lines and some to ground, inductance and resistance arranged in an auxiliary circuit, and automatically-actuated switching mechanism for connecting the inductance and resistance between one of the lines and the ground, and connecting a terminal of the motor between the inductance and resistance.

6. In an alternating-current electric railway, polyphase supply-lines, a vehicle making traveling contact therewith, a motor thereon actuated from the lines, an inductance and a resistance in an auxiliary circuit, switching mechanisms for bringing the inductance and resistance into circuit between either of the supply-lines and ground and connecting a terminal of the motor between the two, and a balanced magnet operating each of the switching mechanisms, each magnet included in a circuit between the motor and the supply-line; whereby upon the failure of the current in either of the supply-lines, an electromotive force of displaced phase is supplied to the motor automatically, thus continuing to operate it as a polyphase motor.

In witness whereof I have hereunto set my hand this 3d day of October, 1895.

ERNST J. BERG.

Witnesses:
A. F. MACDONALD,
E. W. CADY.